United States Patent
Sendik (10) Patent No.: US 9,727,967 B2
(45) Date of Patent: Aug. 8, 2017

(54) METHODS FOR DETERMINING ESTIMATED DEPTH IN AN IMAGE AND SYSTEMS THEREOF

(71) Applicant: Samsung Electronics Co., Ltd., Suwon-Si, Gyeonggi-Do (KR)

(72) Inventor: Omry Sendik, Ramat Gan (IL)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 527 days.

(21) Appl. No.: 14/311,905

(22) Filed: Jun. 23, 2014

(65) Prior Publication Data

US 2015/0371395 A1   Dec. 24, 2015

(51) Int. Cl.
| | | |
|---|---|---|
| *G06K 9/00* | (2006.01) | |
| *G06T 7/00* | (2017.01) | |
| *H04N 5/222* | (2006.01) | |
| *G06T 7/215* | (2017.01) | |
| *H04N 5/14* | (2006.01) | |
| *G06T 7/50* | (2017.01) | |
| *G06T 7/579* | (2017.01) | |

(52) U.S. Cl.
CPC ............ *G06T 7/0071* (2013.01); *G06T 7/215* (2017.01); *G06T 7/50* (2017.01); *G06T 7/579* (2017.01); *H04N 5/145* (2013.01); *H04N 5/2226* (2013.01); *G06K 2209/40* (2013.01); *G06T 2207/10016* (2013.01); *G06T 2207/30236* (2013.01); *G06T 2207/30252* (2013.01)

(58) Field of Classification Search
CPC ......... G06T 2207/10028; G06T 7/0051; G06T 7/0065; G06T 7/0067; G06T 7/0069; G06T 7/0071; G06T 7/20; G06T 7/2006; G06T 7/10; G06T 7/194; G06T 7/215; G06T 7/50; G06T 7/55; G06T 7/579; G06F 17/30811; G09G 2320/106; H04N 5/145; H04N 5/2226; G06K 2209/40
USPC ........ 382/100, 106, 107, 154, 289, 312, 325
See application file for complete search history.

(56) References Cited

U.S. PATENT DOCUMENTS

| | | | |
|---|---|---|---|
| 6,262,409 B1 | 7/2001 | Avaro et al. | |
| 7,844,134 B2 * | 11/2010 | Sasaki | H04N 5/23248 382/107 |
| 8,059,157 B2 | 11/2011 | Kuo et al. | |

(Continued)

FOREIGN PATENT DOCUMENTS

| | | |
|---|---|---|
| JP | 2009141717 A | 6/2009 |
| JP | 2011135462 A | 7/2011 |
| JP | 2013120435 A | 6/2013 |

OTHER PUBLICATIONS

Wei Hong, Dennis Wei, and Aziz Umit Batur, "Video Stabilization and Rolling Shutter Distortion Reduction", IEEE, Proceedings of the 17th IEEE International Conference on Image Processing (ICIP), Sep. 2010, pp. 3501-3504.*

(Continued)

*Primary Examiner* — Eric Rush
(74) *Attorney, Agent, or Firm* — Harness, Dickey & Pierce, P.L.C.

(57) ABSTRACT

An example embodiment discloses a method of determining an estimated depth of an object in an image. The method includes determining an estimated shear due to a rolling shutter image sensor in a plurality of regions of a current frame of the image and determining the estimated depth based on the estimated shear.

12 Claims, 10 Drawing Sheets

(56) References Cited

U.S. PATENT DOCUMENTS

| | | | | |
|---|---|---|---|---|
| 8,179,446 | B2* | 5/2012 | Hong | H04N 5/145 382/293 |
| 8,718,402 | B2* | 5/2014 | Liu | G06T 7/579 382/285 |
| 8,908,041 | B2* | 12/2014 | Stein | G06K 9/00791 348/148 |
| 8,922,626 | B2* | 12/2014 | Aoki | G01C 3/085 348/36 |
| 9,131,155 | B1* | 9/2015 | Dolgin | G06T 7/20 |
| 9,171,372 | B2* | 10/2015 | Zhang | G06T 7/579 |
| 9,277,132 | B2* | 3/2016 | Berberian | H04N 5/23248 |
| 2009/0201383 | A1 | 8/2009 | Slavin | |
| 2010/0188584 | A1 | 7/2010 | Liu et al. | |
| 2010/0328486 | A1 | 12/2010 | Steinberg et al. | |
| 2012/0154528 | A1 | 6/2012 | Hidaka et al. | |
| 2013/0010084 | A1* | 1/2013 | Hatano | G03B 35/08 348/47 |
| 2016/0292882 | A1* | 10/2016 | Comport | G06T 7/204 |

OTHER PUBLICATIONS

Omar Ait-Aider, Nicolas Andreff, Jean Marc Lavest, and Philippe Martinet, "Exploiting Rolling Shutter Distortions for Simultaneous Object Pose and Velocity Computation Using a Single View", IEEE, Proceedings of the Fourth International Conference on Computer Vision Systems (ICVS), Jan. 2006, pp. 1-7.*

Olivier Saurer, Kevin Koser, Jean-Yves Bouguet, and Marc Pollefeys, "Rolling Shutter Stereo", IEEE, International Conference on Computer Vision, Dec. 2013, pp. 465-472.*

Chung, R. "Efficient Block-based Motion Segmentation Method Using Motion Vector Consistency", p. 1-4, 2005.

* cited by examiner

METHODS FOR DETERMINING ESTIMATED DEPTH IN AN IMAGE AND SYSTEMS THEREOF

BACKGROUND

Rolling shutter effects are usually found in video and digital still cameras including complementary metal oxide semiconductor (CMOS) image sensors. In these example devices, each frame is recorded by scanning across the frame either vertically or horizontally, rather than from a snapshot of a single point in time. Because all parts of an image are not recorded at exactly the same time, the image may bend in one direction or another as the camera or object moves from one side to another. As a result, image distortions may occur.

SUMMARY

At least some example embodiments disclose methods and/or systems for determining a depth of an object in an image using the image distortion.

At least one example embodiment discloses a method of determining an estimated depth of an object in an image. The method includes determining, by a processor, an estimated shear due to a rolling shutter in a plurality of regions of a current frame of the image and determining, by the processor, the estimated depth based on the estimated shear.

In an example embodiment, the method further includes obtaining a previous frame of the image, obtaining the current frame of the image and determining motion vector data for the plurality of regions, respectively, the motion vector data representing motion between corresponding regions in the previous frame and the current frame, the estimated shear being based on the motion vector data.

In an example embodiment, the method further includes determining local motion vector data and global motion vector data among the motion vector data for the plurality of regions, the estimated shear being based on the global motion vector data.

In an example embodiment, the method further includes removing the local motion vector data from the motion vector data.

In an example embodiment, the method further includes segmenting the global motion vector data into segments, each segment associated a different motion, the estimated shear being based on the segmented global motion vector data.

In an example embodiment, the method further includes determining a displacement between at least one region in the previous frame and the current frame based on the global motion vector data, the estimated depth being based on the determined displacement.

In an example embodiment, the displacement is proportional to estimated shear for the at least one region.

At least one example embodiment discloses a system including a processor configured to determine an estimated shear due to a rolling shutter in a plurality of regions of a current frame of an image and determine an estimated depth of an object in the image based on the estimated shear.

In an example embodiment, the processor is configured to obtain a previous frame of the image, obtain the current frame of the image and determine motion vector data for the plurality of regions, respectively, the motion vector data representing motion between corresponding regions in the previous frame and the current frame, the estimated shear being based on the motion vector data.

In an example embodiment, the processor is configured to determine local motion vector data and global motion vector data among the motion vector data for the plurality of regions, the estimated shear being based on the global motion vector data.

In an example embodiment, the processor is configured to remove the local motion vector data from the motion vector data.

In an example embodiment, the processor is configured to segment the global motion vector data into segments, each segment associated a different motion, the estimated shear being based on the segmented global motion vector data.

In an example embodiment, the processor is configured to determine a displacement between at least one region in the previous frame and the current frame based on the global motion vector data, the estimated depth being based on the determined displacement.

In an example embodiment, the processor is configured to the displacement is proportional to estimated shear for the at least one region.

At least one example embodiment discloses, a digital signal processor configured to determine an estimated shear due to a rolling shutter in a plurality of regions of a current frame of an image and determine an estimated depth of an object in the image based on the estimated shear.

In an example embodiment, the digital signal processor is configured to obtain a previous frame of the image, obtain the current frame of the image and determine motion vector data for the plurality of regions, respectively, the motion vector data representing motion between corresponding regions in the previous frame and the current frame, the estimated shear being based on the motion vector data.

In an example embodiment, digital signal processor is configured to determine local motion vector data and global motion vector data among the motion vector data for the plurality of regions, the estimated shear being based on the global motion vector data.

In an example embodiment, the digital signal processor is configured to remove the local motion vector data from the motion vector data.

In an example embodiment, the digital signal processor is configured to segment the global motion vector data into segments, each segment associated a different motion, the estimated shear being based on the segmented global motion vector data.

In an example embodiment, the digital signal processor is configured to determine a displacement between at least one region in the previous frame and the current frame based on the global motion vector data, the estimated depth being based on the determined displacement.

In an example embodiment, the displacement is proportional to estimated shear for the at least one region.

At least one example embodiment discloses a non-transitory computer readable medium, when executed on a processor, configured to determine an estimated shear due to a rolling shutter in a plurality of regions of a current frame of an image and determine an estimated depth of an object in the image based on the estimated shear.

BRIEF DESCRIPTION OF THE DRAWINGS

Example embodiments will become more appreciable through the description of the drawings in which.

DETAILED DESCRIPTION

Example embodiments will now be described more fully with reference to the accompanying drawings. Many alternate forms may be embodied and example embodiments should not be construed as limited to example embodiments set forth herein. In the drawings, like reference numerals refer to like elements.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., digital single lens reflex (DSLR) cameras, digital point-and-shoot cameras, personal digital assistants (PDAs), smartphones, tablet personal computers (PCs), laptop computers, etc.). Such existing hardware may include one or more Central Processing Units (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Example embodiments provide methods, devices, and imaging systems for determining depths of objects in images by exploiting rolling shutter artifacts. Example embodiments also provide computer-readable storage mediums storing computer-executable instructions for determining depths of objects in images by exploiting rolling shutter artifacts. Throughout the specification, "RS artifacts" and "RS effects" may be used interchangeably.

Motion causes a shear, which may be related to the speed of the motion of the object. If all of the present motion is assumed to be caused by motion of the camera, farther objects, which appear to move less, are less prone to RS artifacts. Moreover, closer objects, which appear to move faster, are afflicted by harsher RS artifacts. Using this information, the depth of an object in an image may be extracted.

Figure 1A:
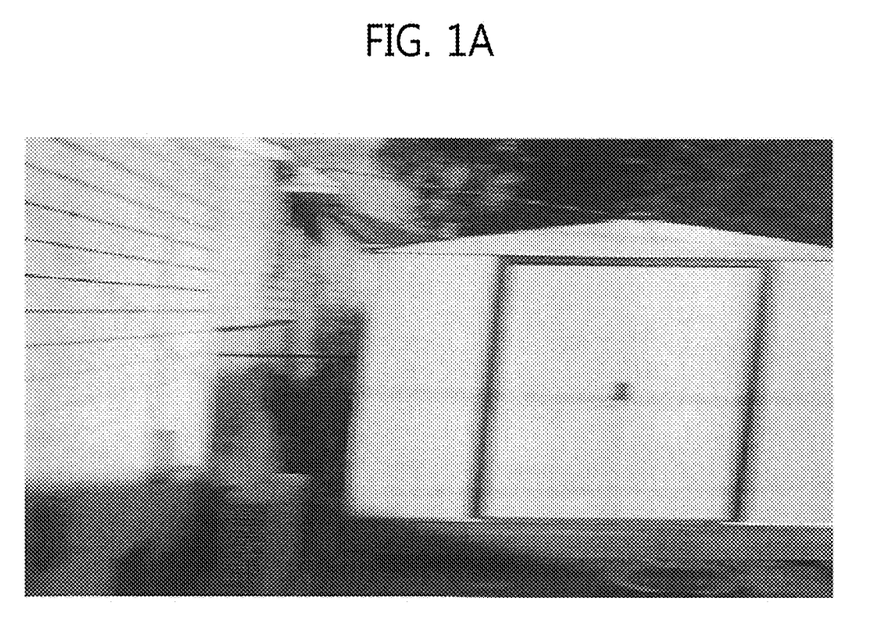
FIGS. 1A and 1B are images depicting example horizontal and vertical rolling shutter effects.
Figure 1B:
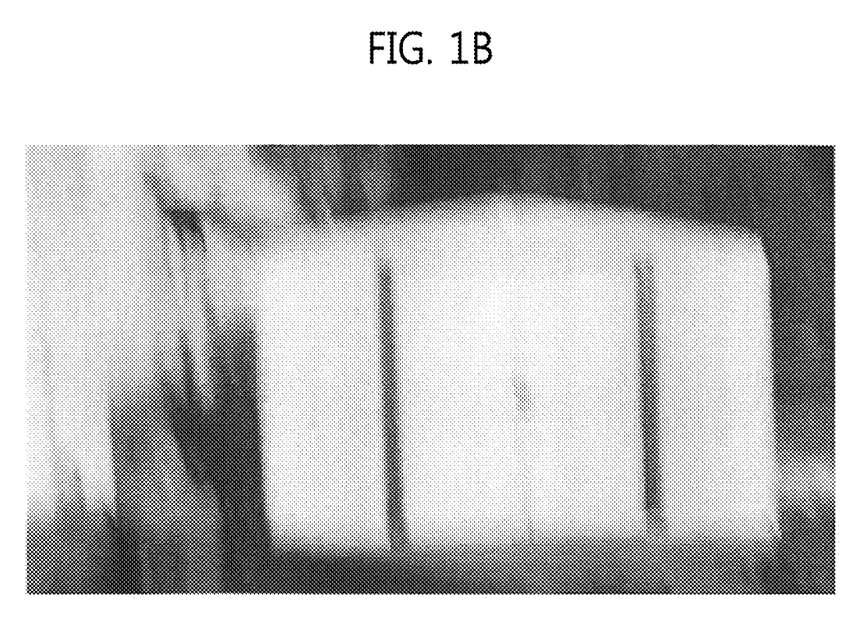

FIGS. 1A and 1B are images depicting example horizontal and vertical rolling shutter effects, respectively. The image distortion shown in FIGS. 1A and 1B may be caused when a camera moves during image capture. In FIG. 1A, the house appears skewed as the camera pans horizontally. In FIG. 1B, the house appears wobbled/scaled as the camera pans vertically.

Rolling shutter effects such as those shown in FIGS. 1A and 1B may degrade a visual quality of images.

Figure 2A:
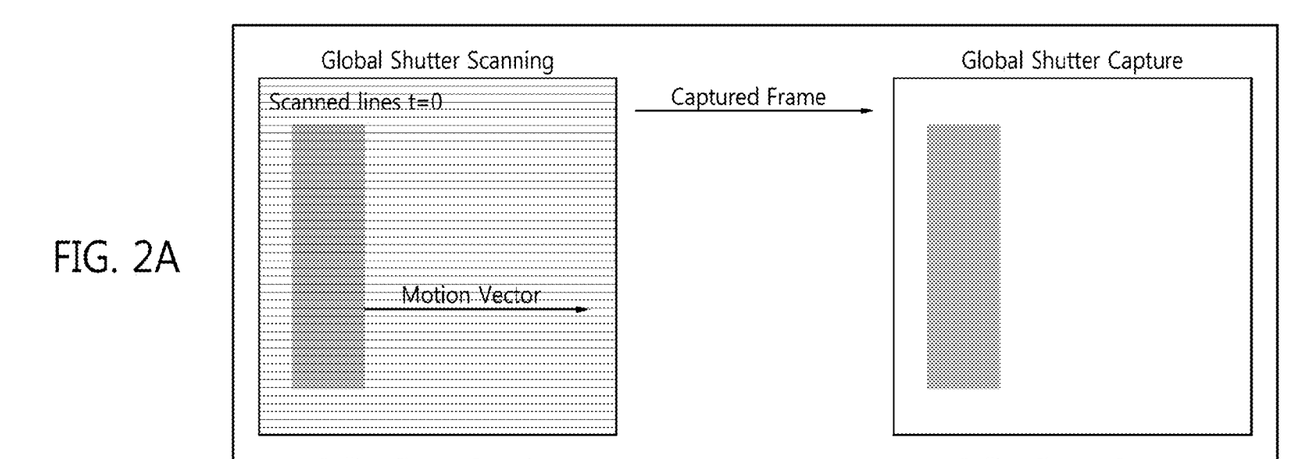
FIGS. 2A-2C illustrate a comparison of a global shutter capture versus a rolling shutter capture.
Figure 2B:
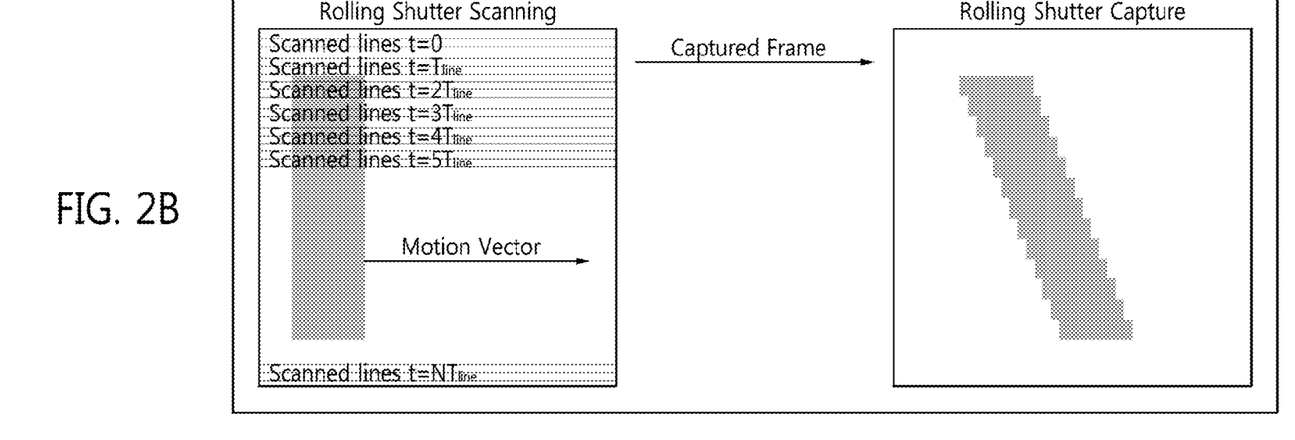
Figure 2C:
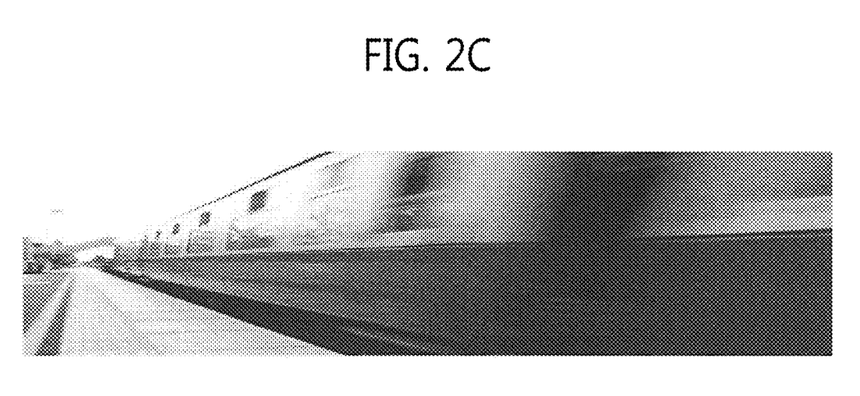

FIGS. 2A-2C illustrate a comparison of a global shutter capture versus a rolling shutter capture.

Rolling shutter effects (RS effects) are usually found in video cameras which consist of a CMOS image sensor in which a frame line-by-line recording is performed (as opposed to a single snapshot of the entire frame).

As shown in FIG. 2A, a global shutter scanning method scans all lines at the same time. However, as shown in FIG. 2B, each line of pixels in an array is scanned at a separate time in a rolling shutter scanning method. For example, each line is scanned at a multiple of a horizontal period $T_{line}$. As lines, and different parts of the image, are recorded at slightly different times, objects which move, appear distorted with shears in the captured rolling shutter image.

In cases where various depths are present in a scene, moving objects at infinity do not present large motions whereas objects close to the camera, present very large motions. FIG. 2C depicts an object (train) with a wide range of depths. FIG. 2C illustrates that as the object approaches infinity, the shear reduces.

Figure 3:
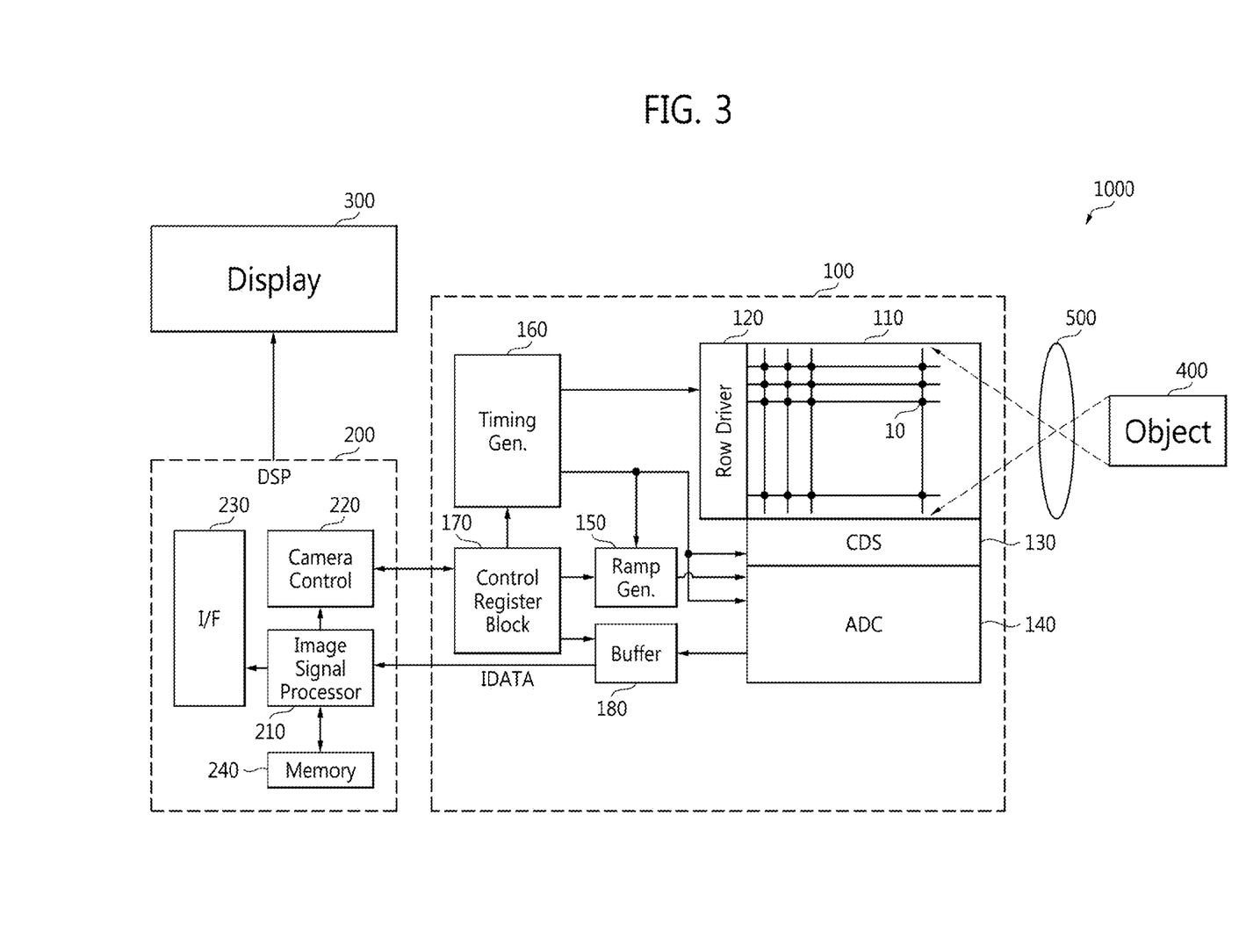
FIG. 3 is a schematic block view of an image processing system according to an example embodiment.

FIG. 3 is a schematic block view of an image processing system according to an example embodiment. Referring to FIG. 3, an image processing system 1000 may be embodied in a portable electronic device such as a digital camera, a mobile phone, a smart phone, a tablet personal computer (PC), a personal digital assistant (PDA), a mobile internet device (MID), or a wearable computer or another electronic device (e.g., laptop computer, etc.) including, associated with or connected to a camera.

The image processing system 1000 includes a CMOS image sensor 100, a digital signal processor (DSP) 200, a display 300, and an optical lens 500. According to an example embodiment, the image processing system 1000 may not include the optical lens 500.

The CMOS image sensor 100 may generate image data IDATA for a subject incident through the optical lens 500. The CMOS image sensor 100 may be embodied in a backside illumination (BSI) image sensor.

The CMOS image sensor 100 may include an active pixel sensor array 110, a row driver 120, a correlated double sampling (CDS) block 130, an analog-to-digital converting (ADC) block 140, a ramp generator 150, a timing generator 160, a control register block 170, and a buffer 180.

The CMOS image sensor 100 may sense an image of the subject 400 captured or incident through the optical lens 500, and generate image data IDATA corresponding to a result of the sensing.

The active pixel sensor array 110 includes a plurality of pixels 10 arranged in an array of rows and columns. As discussed herein, rows and columns may be collectively referred to as lines. Each of a plurality of read and reset lines corresponds to a line of pixels in the pixel array 110. In FIG. 3, each pixel may be an active-pixel sensor (APS).

Although example embodiments may be discussed herein with regard to lines (e.g., rows and/or columns) of a pixel array, it should be understood that the same principles may be applied to pixels grouped in any manner.

The row driver 120 may generate control signals which may control an operation of each of a plurality of pixels included in the active pixel sensor array 110. The CDS block 130 may perform a correlated double sampling operation on a pixel signal output from each of the plurality of pixels using a ramp signal output from the ramp generator 150, and output a correlated double sampled pixel signal. The ADC block 140 may convert each of the correlated double sampled pixel signals into each digital signal by the CDS block 130.

The timing generator 160 may control the row driver 120, the CDS block 130, the ADC block 140, and/or the ramp generator 150 based on output signals of the control register block 170.

The control register block 170 may store control bits which may control an operation of the timing generator 160, the ramp generator 150, and/or the buffer 180. The buffer 180 may buffer digital signals output from the ADC block 140 and generate image data IDATA according to a result of the buffering. A DSP 200 may output image signals corresponding to the image data IDATA output from the CMOS image sensor 100 to a display 300.

The DSP 200 includes an image signal processor (ISP) 210, a camera controller 220, an interface (I/F) 230 and a memory 240.

The ISP 210 receives the image data IDATA output from the buffer 180, processes the received image data IDATA to be visible to people, outputs the processed image data to the display 300 through the I/F 230 and/or stores the generated image in the memory 240. The DSP 200 may also store image data IDATA in the memory 240.

The memory 240 may be any well-known non-volatile memory and/or combination of volatile and non-volatile memories. Because such memories are well-known, a detailed discussion is omitted.

The camera controller 220 controls an operation of the control register block 170. The camera controller 220 controls an operation of the CMOS image sensor 100, e.g., the control register block 170, using a protocol, e.g., an inter-integrated circuit (I2C); however, example embodiments are not limited thereto.

In FIG. 3, it is illustrated that the ISP 210 is embodied in the DSP 200, however the ISP 210 may be embodied in the CMOS image sensor 100 according to an example embodiment. Moreover, the CMOS image sensor 100 and the ISP 210 may be embodied in one package, e.g., a multi-chip package (MCP) or a package on package (PoP).

Figure 4:
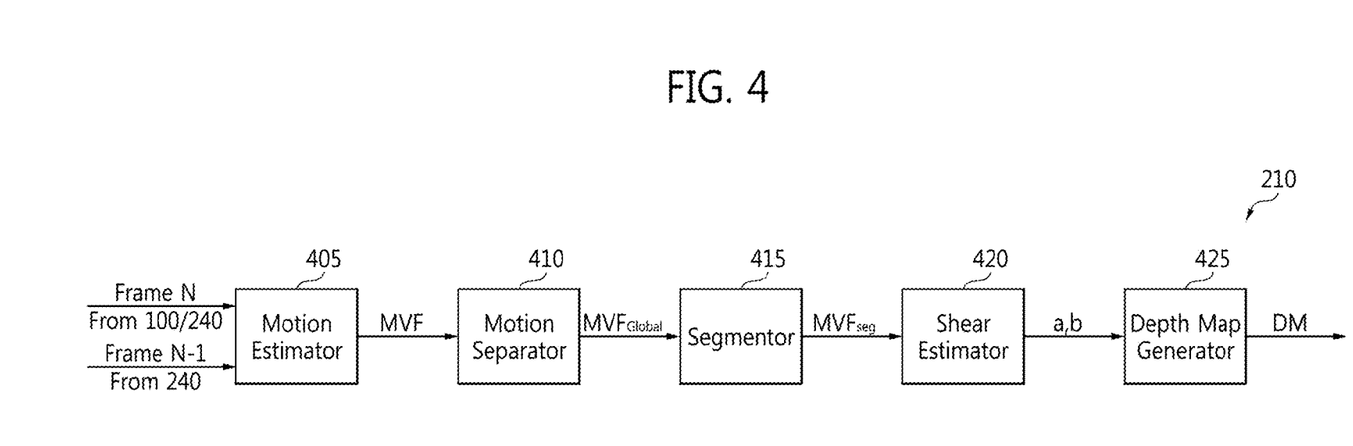
FIG. 4 illustrates a block diagram of the image signal processor according to an example embodiment.

FIG. 4 illustrates an example embodiment of the image signal processor 210, according to an example embodiment. As shown, the image signal processor 210 includes a motion estimator 405, a motion separator 410, a segmentor 415, a shear estimator 420 and a depth map generator 425.

The motion estimator 405, a motion separator 410, a segmentor 415, a shear estimator 420 and a depth map generator 425 may be embodied by hardware, software, firmware, middleware, microcode, hardware description languages, or any combination thereof.

When the motion estimator 405, the motion separator 410, the segmentor 415, the shear estimator 420 and/or the depth map generator 425 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the respective functions. CPUs, DSPs, ASICs and FPGAs may generally be referred to as processors and/or microprocessors.

In the event where the motion estimator 405, the motion separator 410, the segmentor 415, the shear estimator 420 and/or the depth map generator 425 is a processor executing software, the DSP 200 and/or the image signal processor 210 are configured as special purpose machines to execute the software to perform the functions of the motion estimator 405, the motion separator 410, the segmentor 415, the shear estimator 420 and/or the depth map generator 425. In such an embodiment, the DSP 200 and/or the image signal processor 210 may include one or more Central Processing Units (CPUs), digital signal processors (DSPs), application-specific-integrated-circuits (ASICs), field programmable gate arrays (FPGAs) computers.

Still referring to FIG. 3, the motion estimator 405 receives a current frame N from either the image sensor 100 or the memory 240 and a previous frame N−k from the memory 240, where k is an integer greater than or equal to one. The previous frame and the current frame may be referred to as frames of the same image or first and second images, respectively. The first and second images, for example, are successive images. For example, the first image is a previous image captured prior to the second image, which is a current image.

The motion estimator 405 estimates a location to which a pixel, in frame N−1, has moved to, in frame N. The motion estimator 405 may estimate the motion of each line of pixels 10 using a known similarity measure such as the Sum of Absolute Differences or Normalized Cross Correlation. The motion estimator 405 then outputs the estimated motion for each line as a motion vector to the motion separator 410. The ensemble of motion vectors is termed a MVF (motion vector field).

Figure 5A:
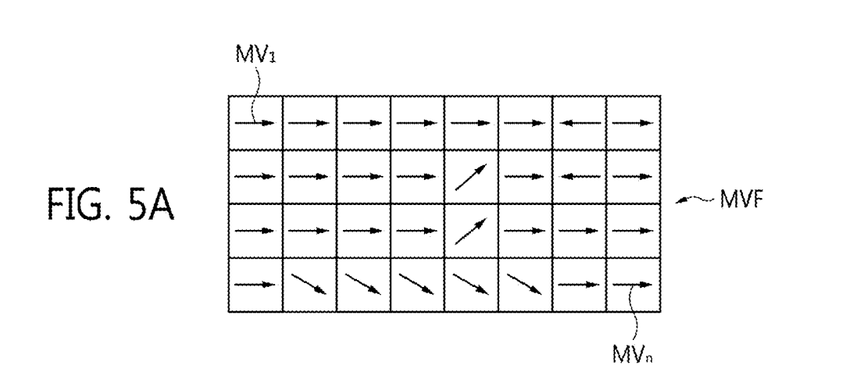
FIGS. 5A-5D illustrate motion vector fields and a depth map according to an example embodiment.

FIG. 5A illustrates the motion vector field MVF output by the motion estimator 405. As shown, each group of pixels has an associated motion vector $MV_1$-$MV_n$ that represents the motion between the first image and the second image for the associated group of pixels.

At least some example embodiments assume the motion between the two sequential frames is caused solely by global motion. In other words, local motion may be detected by objects which move in a speed which causes an extreme shear. This in turn means that the shear associated with local motion is not related to their distance from the camera (or their depth). Therefore, the image signal processor 210 filters out any motion vectors which are not estimations of global motion.

As should be understood, global motion is motion caused by a movement that affects the entire image such as movement of the camera and local motion is motion of an object within the image.

Referring back to FIG. 4, the motion separator 410 generates a global motion vector field $MVF_{Global}$ by performing global/local separation on the motion vector field MVF. The motion separator 410 may use any known method to perform global/local separation. In other words, the motion separator 410 performs a foreground/background separation phase to filter out any motion vectors which are not estimations of global motion (e.g., estimations of local motion).

Figure 5B:
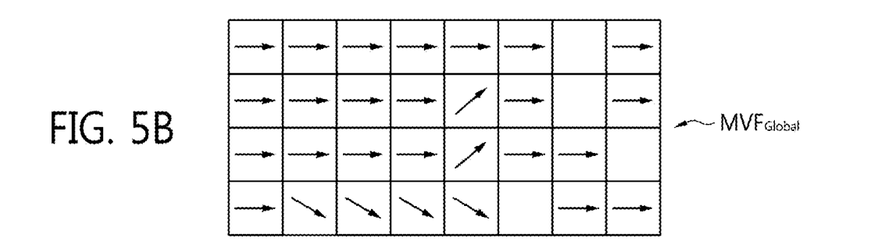

FIG. 5B illustrates an example embodiment of the global motion vector field $MVF_{Global}$. As shown, the motion separator 410 removes four motion vectors from the motion vector field MVF, which correspond to local motion, to generate the global motion vector field $MVF_{Global}$.

Figure 5C:
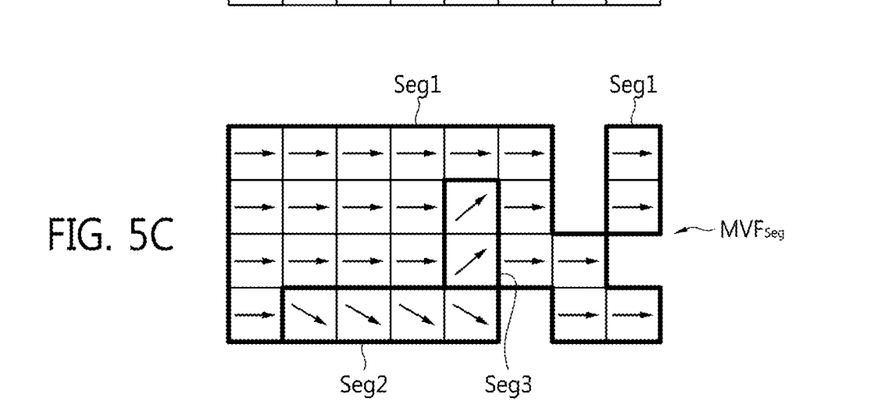

As shown in FIG. 4, the segmentor 415 segments the global motion vector field $MVF_{Global}$ into segments where the motion vectors in the same segment have equal motion because similar motion implies that the underlying moving pixels have a similar shear and in turn similar depth. FIG. 5C illustrates an example embodiment of a segmented motion vector field $MVF_{Seg}$. As shown in FIG. 5C, the segmentor 415 determines that three segments Seg1, Seg2 and Seg3 exist in the global motion vector field $MVF_{Global}$.

Any known segmentation method may be used such as the method described in Chung et al., "Efficient Block-based Motion Segmentation Method using Motion Vector Consistency," MVA 2005, the entire contents of which are hereby incorporated by reference.

The shear estimator 420 determines estimated shears for each segment Seg1, Seg2 and Seg3 using the segmented motion vector field $MVF_{Seg}$. In the example of FIG. 5C, the shear estimator 420 estimates three shears for segments Seg1, Seg2 and Seg3, respectively.

The shear estimator 420 determines the shears for segments Seg1, Seg2 and Seg3, respectively, based on an associated horizontal speed component $v_x$ and an associated vertical speed component $v_y$ for each pixel in the segment. The associated horizontal speed component $v_x$ and the associated vertical speed component $v_y$ are proportional to the magnitudes of the $\Delta x$ and $\Delta y$ components, respectively, of the motion vector associated with the pixel.

The shear estimator 420 uses an affine transformation to rectify rolling shutter distortion of the second image according to a horizontal translation $\Delta x$ and vertical translation $\Delta y$. That is, for example, the shear estimator 420 may apply an inverse affine transformation matrix according to the horizontal translation $\Delta x$ and the vertical translation $\Delta y$ of a selected pixel.

While an affine transformation is described, it should be understood that in some example embodiments, the shear values are transformed into depths without rectifying the rolling shutter distortion, thereby not requiring the affine transformation.

A general affine transformation may be described as:

$$\begin{pmatrix} x_{out} \\ y_{out} \\ 1 \end{pmatrix} = \begin{pmatrix} a_{11} & a_{12} & a_{13} \\ a_{21} & a_{22} & a_{23} \\ 0 & 0 & 1 \end{pmatrix} \begin{pmatrix} x_{in} \\ y_{in} \\ 1 \end{pmatrix} \quad (1)$$

where $x_{in}$ and $y_{in}$ are the coordinates of a pixel 10 on the image sensor 100 and $x_{out}$ and $y_{out}$ are the coordinates of an output point.

The RS effect is given by the following affine matrix:

$$\begin{pmatrix} x_{out} \\ y_{out} \\ 1 \end{pmatrix} = \begin{pmatrix} 1 & a & 0 \\ 0 & 1+b & 0 \\ 0 & 0 & 1 \end{pmatrix} \begin{pmatrix} x_{in} \\ y_{in} \\ 1 \end{pmatrix} \quad (2)$$

where a causes a horizontal shearing (it skews the image horizontally) and b causes scaling only in the vertical axis (it scales only on the y axis).

The shear value a and the scaling value b, which cause the RS effect, may be used to fix the current frame by applying the inverse Transformation which is given by the inverse matrix:

$$\begin{pmatrix} 1 & a & 0 \\ 0 & 1+b & 0 \\ 0 & 0 & 1 \end{pmatrix}^{-1} = \begin{pmatrix} 1 & -\frac{a}{1+b} & 0 \\ 0 & \frac{1}{1+b} & 0 \\ 0 & 0 & 1 \end{pmatrix} \quad (3)$$

The shear value a and the scaling value b are affected by the horizontal translation Δx and vertical translation Δy in the following way:

$$\begin{pmatrix} x_{out} \\ y_{out} \\ 1 \end{pmatrix} = \begin{pmatrix} 1 & \Delta x \cdot \frac{(1-FPS \cdot V_{blank})}{\#_{Rows}} & 0 \\ 0 & 1+\Delta y \cdot \frac{(1-FPS \cdot V_{blank})}{\#_{Rows}} & 0 \\ 0 & 0 & 1 \end{pmatrix} \begin{pmatrix} x_{int} \\ y_{in} \\ 1 \end{pmatrix} \quad (4)$$

where FPS is the frame rate, $V_{blank}$ is a parameter which is set for each sensor and is known and $\#_{Rows}$ is the number of rows in the image sensor, which is also known.

The shear estimator 420 may determine the horizontal translation Δx and vertical translation Δy by using the Sum of Absolute Differences values that were determined by the motion estimator 405. By determining the horizontal translation Δx and vertical translation Δy, the shear estimator 420 determines the shear value a and the scale value b and outputs the shear value a and scale value b to the depth map generator 425.

In RS based sensors, the shear degree is proportional to the speed of the moving object. In other words, due to the fact that the local motion is removed, the speed of a moving object is proportional to its shear degree which may be related to its depth.

Therefore, depth map generator 425 may replace the shear value a and the scale value b with products of an associated velocity component and the horizontal scanning period $T_{line}$, respectively, as shown below:

$$\begin{pmatrix} x_{out} \\ y_{out} \\ 1 \end{pmatrix} = \begin{pmatrix} 1 & v_x \cdot T_{line} & 0 \\ 0 & 1+v_y \cdot T_{line} & 0 \\ 0 & 0 & 1 \end{pmatrix} \begin{pmatrix} x_{in} \\ y_{in} \\ 1 \end{pmatrix} \quad (5)$$

where $v_x$ is the associated horizontal speed component and $v_y$ is the associated vertical speed component.

Using matrix 5, the depth map generator 425 generates depths for the regions associated with the global motion.

Figure 5D:
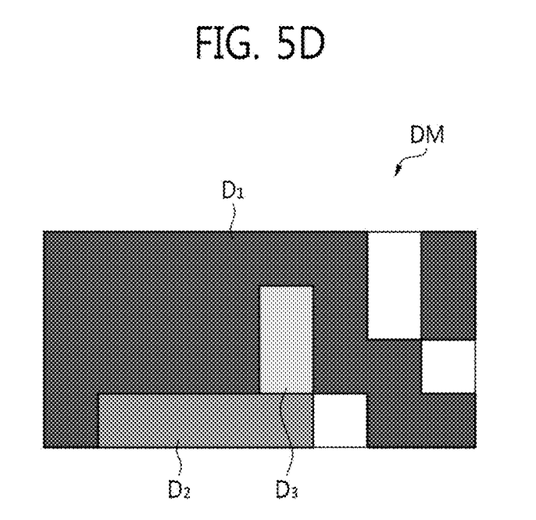

FIG. 5D illustrates a depth map DM that corresponds to the global motion vector field $MVF_{Global}$, generated by the depth map generator 425. As shown in FIG. 5D, the depth map DM includes depths D1, D2 and D3 associated with segments Seg1, Seg2 and Seg3, respectively.

Once the shear values a are known, the depth map generator 425 assumes all objects with similar shears have equal depths.

Consequently, the depth map generator 425 generates a depth for an object relative to other objects in the image.

As described above, the rolling shutter artifacts are used as indicators of depths and used to determine the depths.

Figure 6:
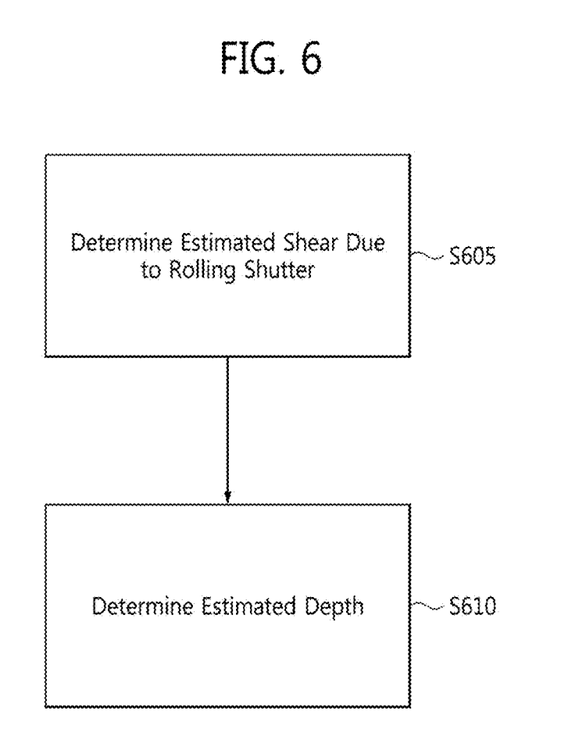
FIG. 6 illustrates a method of determining an estimated depth of an object in an image according to an example embodiment.

FIG. 6 is a flowchart depicting a method of determining an estimated depth of an object in an image. The method shown in FIG. 6 may be performed by the image system 1000, shown in FIG. 3.

Referring to FIGS. 3 and 6, at S605 the image signal processor 210 determines an estimated shear (e.g., shear value a) due to a rolling shutter in a plurality of regions of a current frame of the image. At S610, the image signal processor 210 determines the estimated depth (e.g., D1-D3) based on the estimated shear.

In an example embodiment, the method further includes obtaining a previous frame of the image (e.g., frame N−1), obtaining the current frame of the image and determining motion vector data for the plurality of regions, respectively, the motion vector data representing motion between corresponding regions in the previous frame and the current frame, the estimated shear being based on the motion vector data.

In an example embodiment, the method further includes deter mining local motion vector data and global motion vector data among the motion vector data for the plurality of regions, the estimated shear being based on the global motion vector data.

In an example embodiment, the method further includes removing the local motion vector data from the motion vector data.

In an example embodiment, the method further includes segmenting the global motion vector data into segments, each segment associated a different motion, the estimated shear being based on the segmented global motion vector data.

In an example embodiment, the method further includes deter mining a displacement between at least one region in the previous frame and the current frame based on the global motion vector data, the estimated depth being based on the determined displacement.

In an example embodiment, the displacement is proportional to estimated shear for the at least one region.

Figure 7:
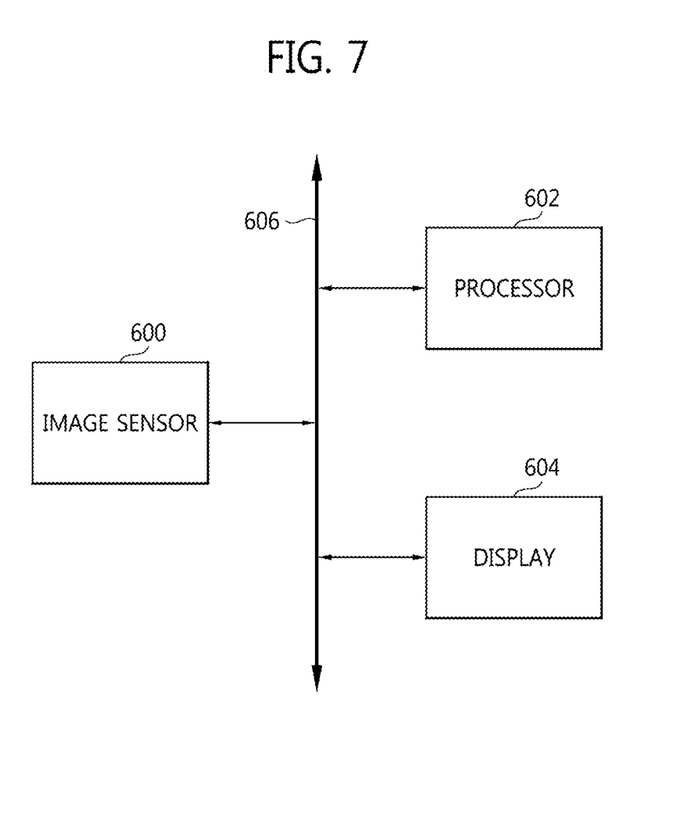
FIG. 7 illustrates a digital imaging system according to an example embodiment.

FIG. 7 is a block diagram illustrating a digital imaging system according to an example embodiment.

Referring to FIG. 7, a processor 602, an image sensor 600, and a display 604 communicate with each other via a bus 606. The processor 602 is configured to execute a program and control the digital imaging system. The image sensor 600 is configured to capture image data by converting optical images into electrical signals. The image sensor 600 may be an image sensor as described above with regard to FIG. 3. The processor 602 may include the image signal processor 210 shown in FIG. 3, and may be configured to process the captured image data for storage in a memory (not shown) and/or display by the display unit 604. The digital imaging system may be connected to an external device (e.g., a personal computer or a network) through an input/output device (not shown) and may exchange data with the external device.

For example, the digital imaging system shown in FIG. 7 may embody various electronic control systems including an image sensor (e.g., a digital camera), and may be used in, for example, mobile phones, personal digital assistants (PDAs), laptop computers, netbooks, tablet computers, MP3 players, navigation devices, household appliances, or any other device utilizing an image sensor or similar device.

The foregoing description of example embodiments has been provided for purposes of illustration and description. It is not intended to be exhaustive or limiting. Individual elements or features of a particular example embodiment are generally not limited to that particular example embodiment. Rather, where applicable, individual elements or features are interchangeable and may be used in a selected embodiment, even if not specifically shown or described. The same may also be varied in many ways. All such modifications are intended to be included within the scope of this disclosure.

What is claimed is:

1. A system comprising:
a processor configured to execute computer-readable instructions to,
  determine an estimated shear due to a rolling shutter in a plurality of regions of a current frame of an image; and
  determine an estimated depth of an object in the image based on the estimated shear, the processor further configured to execute the computer-readable instructions to,
    obtain a previous frame of the image,
    obtain the current frame of the image,
    determine motion vector data for the plurality of regions, respectively, the motion vector data representing motion between corresponding regions in the previous frame and the current frame,
    determine local motion vector data and global motion vector data among the motion vector data for the plurality of regions, and
    segment the global motion vector data into segments, wherein each segment is associated with a different motion, the estimated shear being based on the segmented global motion vector data.

2. The system of claim 1, wherein the processor is configured to execute the computer-readable instructions to,
  remove the local motion vector data from the motion vector data.

3. The system of claim 1, wherein the processor is configured to execute the computer-readable instructions to,
  determine a displacement between at least one region in the previous frame and the current frame based on the global motion vector data, the estimated depth being based on the determined displacement.

4. The system of claim 3, wherein the displacement is proportional to estimated shear for the at least one region.

5. The system of claim 1, wherein the processor is configured to execute the computer-readable instructions to generate a depth map having a plurality of map segments, each map segment of the depth map corresponding to one of the segments of the global motion vector data.

6. A digital signal processor configured to execute computer-readable instructions to,
  determine an estimated shear due to a rolling shutter in a plurality of regions of a current frame of an image; and
  determine an estimated depth of an object in the image based on the estimated shear, the digital signal processor further configured to execute the computer-readable instructions to,
    obtain a previous frame of the image,
    obtain the current frame of the image,
    determine motion vector data for the plurality of regions, respectively, the motion vector data representing motion between corresponding regions in the previous frame and the current frame,
    determine local motion vector data and global motion vector data among the motion vector data for the plurality of regions, and
    segment the global motion vector data into segments, wherein each segment is associated with a different motion, the estimated shear being based on the segmented global motion vector data.

7. The digital signal processor of claim 6, wherein the digital signal processor is configured to execute the computer-readable instructions to,
  remove the local motion vector data from the motion vector data.

8. The digital signal processor of claim 6, wherein the digital signal processor is configured to execute the computer-readable instructions to,
  determine a displacement between at least one region in the previous frame and the current frame based on the global motion vector data, the estimated depth being based on the determined displacement.

9. The digital signal processor of claim 8, wherein the displacement is proportional to estimated shear for the at least one region.

10. The digital signal processor of claim 6, wherein the digital signal processor is configured to execute the computer-readable instructions to generate a depth map having a plurality of map segments, each map segment of the depth map corresponding to one of the segments of the global motion vector data.

11. A non-transitory computer-readable medium storing computer executable instructions, when executed on a processor, configured to,
  determine an estimated shear due to a rolling shutter in a plurality of regions of a current frame of an image;
  determine an estimated depth of an object in the image based on the estimated shear;
  obtain a previous frame of the image
  obtain the current frame of the image;
  determine motion vector data for the plurality of regions, respectively, the motion vector data representing motion between corresponding regions in the previous frame and the current frame;
  determine local motion vector data and global motion vector data among the motion vector data for the plurality of regions; and
  segment the global motion vector data into segments, wherein each segment is associated with a different motion, the estimated shear being based on the segmented global motion vector data.

12. The non-transitory computer-readable medium of claim 11, when executed on the processor, configured to generate a depth map having a plurality of map segments, each map segment of the depth map corresponding to one of the segments of the global motion vector data.

* * * * *